United States Patent
Choi

(10) Patent No.: US 10,041,580 B2
(45) Date of Patent: Aug. 7, 2018

(54) TRACTOR WITH IMPROVED CLUTCH HOUSING

(71) Applicant: DAEDONG INDUSTRIAL CO., LTD., Daegu (KR)

(72) Inventor: Jin Ha Choi, Changyeong-eup (KR)

(73) Assignee: DAEDONG INDUSTRIAL CO., LTD., Daegu (KR)

( * ) Notice: Subject to any disclaimer, the term of this patent is extended or adjusted under 35 U.S.C. 154(b) by 0 days.

(21) Appl. No.: 15/478,255

(22) Filed: Apr. 4, 2017

(65) Prior Publication Data

US 2017/0299048 A1    Oct. 19, 2017

(30) Foreign Application Priority Data

Apr. 15, 2016    (KR) .................. 10-2016-0046154

(51) Int. Cl.
   *F16H 57/04*    (2010.01)
   *F16H 47/02*    (2006.01)
   *B60K 17/344*   (2006.01)

(52) U.S. Cl.
   CPC ......... *F16H 57/0473* (2013.01); *F16H 47/02* (2013.01); *F16H 57/0402* (2013.01); *B60K 17/344* (2013.01); *F16D 2300/0214* (2013.01); *F16D 2300/06* (2013.01)

(58) Field of Classification Search
   CPC .. F16H 57/0473; F16H 57/0402; F16H 47/02; B60K 17/344; F16D 2300/06; F16D 2300/0214
   See application file for complete search history.

(56) References Cited

U.S. PATENT DOCUMENTS

| | | | | |
|---|---|---|---|---|
| 3,255,589 A | * | 6/1966 | Heinrich | F16H 39/06 475/75 |
| 5,544,547 A | * | 8/1996 | Ishimaru | B60K 17/04 74/15.82 |
| 5,913,950 A | * | 6/1999 | Matsufuji | B60K 17/04 74/606 R |
| 6,321,867 B1 | * | 11/2001 | Kowalyk | B62D 53/026 180/307 |
| 7,900,737 B2 | * | 3/2011 | Isogai | B60K 17/10 180/305 |

FOREIGN PATENT DOCUMENTS

| | | |
|---|---|---|
| JP | H07149158 A | 6/1995 |
| JP | 2006025737 A | 2/2006 |
| KR | 19980001138 A | 3/1998 |
| KR | 20130103456 A | 9/2013 |

\* cited by examiner

*Primary Examiner* — David J Hlavka
(74) *Attorney, Agent, or Firm* — Mark M. Friedman

(57) ABSTRACT

There is provided a tractor with an improved clutch housing structure, which includes a hydro-static transmission (HST) positioned between a clutch and a secondary transmission, to transmit power. The tractor comprises: a clutch housing with the clutch and the HST positioned inside; a partition to separate the clutch from the HST formed inside the clutch housing; and a heat-radiating opening formed in the partition.

4 Claims, 6 Drawing Sheets

[Figure 1]
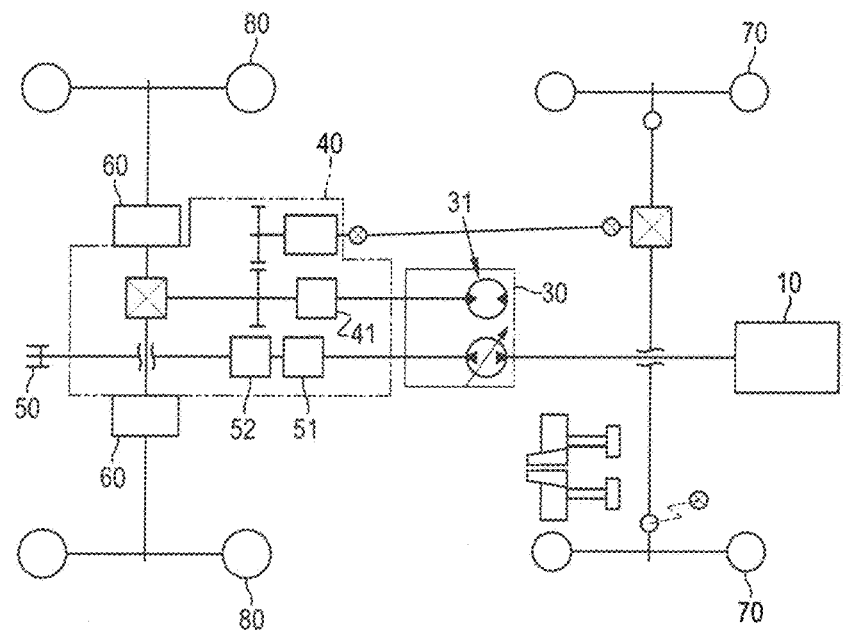
[Figure 2]
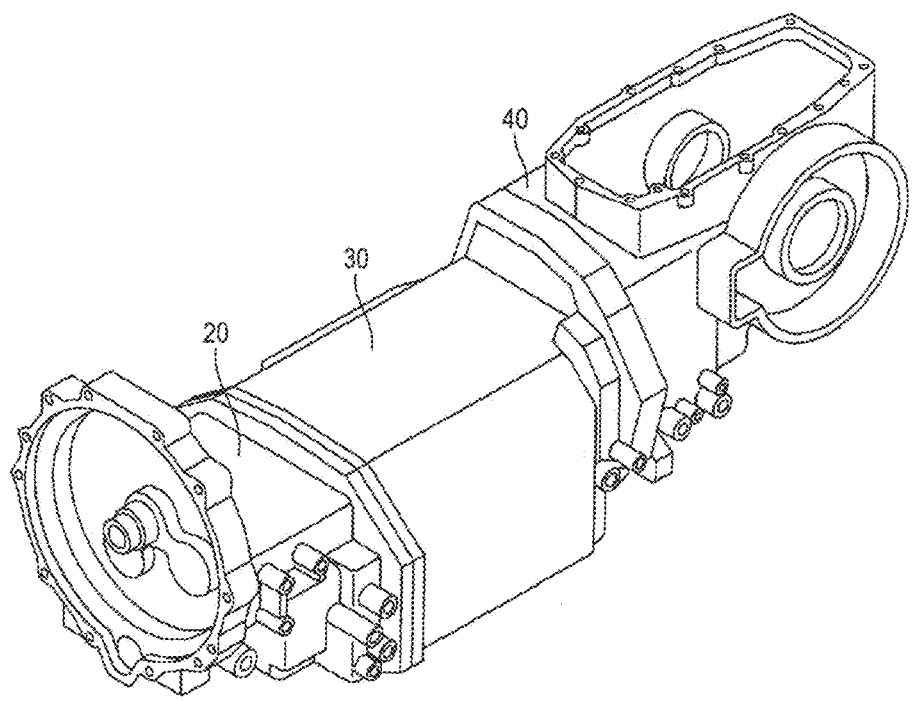

[Figure 3]
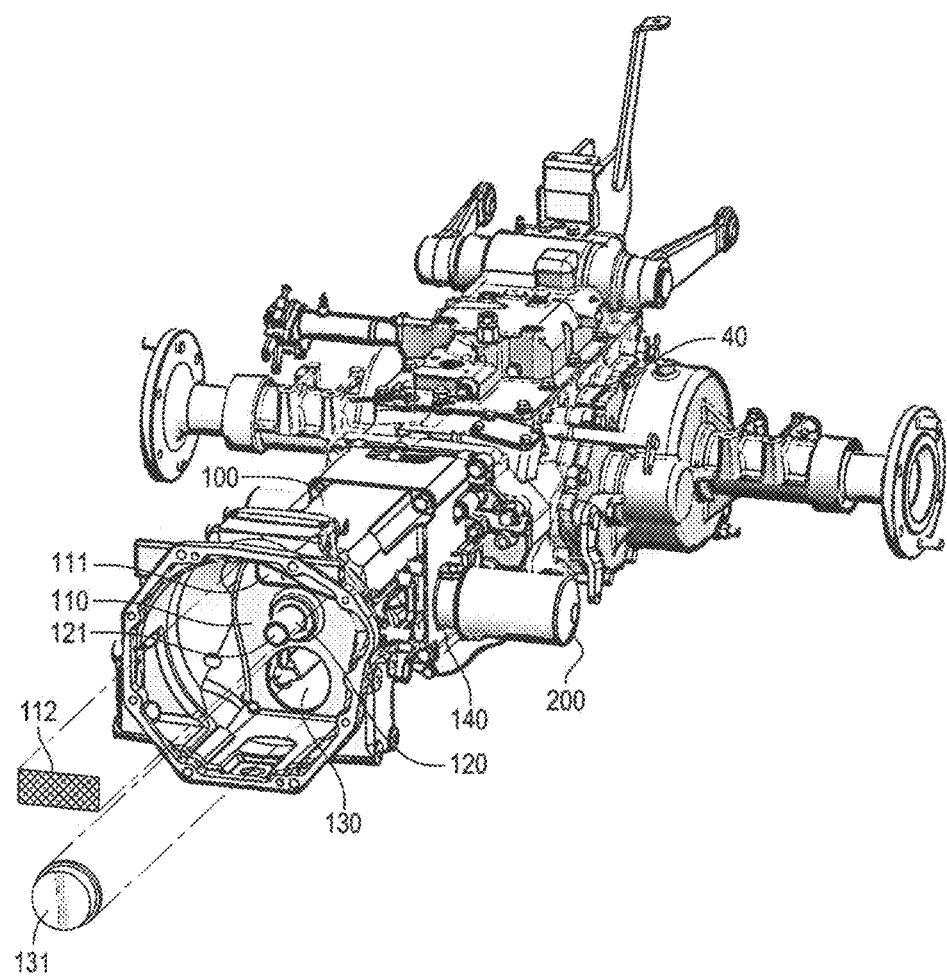

TRACTOR WITH IMPROVED CLUTCH HOUSING

CROSS-REFERENCE TO RELATED APPLICATION

This application claims the benefit of Korean Patent Application No. 10-2016-0046154, filed on Apr. 15, 2016, the disclosure of which is hereby incorporated herein by reference in its entirety.

BACKGROUND OF THE INVENTION

1. Field of the Invention

The present invention relates to a tractor and more particularly, to a tractor with an improved clutch housing in which the clutch housing provided to the tractor includes a hydro-static transmission (HST).

2. Description of the Related Art

In general, although a tractor as a vehicle for agricultural working is structurally similar to a general vehicle, since it has a stronger engine than that of a general vehicle, it has a high traction power and is strong to be usually used for farming. To be used for farming, various farm working machineries are selectively attached to the front, back or front and back of the body of the vehicle.

On the work features, a tractor mainly used for farming is frequently required to change speed from low speed to high speed or from high speed to low speed and to shift gears in a forward or reverse movement direction.

Therefore, a hydro-static transmission (HST) is widely adopted as the means to secure the easiness in operating the power transmission during work or driving, further in operating a tractor.

The HST includes a variable capacity hydraulic oil pump directly which is connected to an output shaft of an engine, and a fixed displacement hydraulic motor which rotates by hydraulic fluid provided from the hydraulic oil pump and outputs substantial running power. The rotation speed and rotation direction of the fixed displacement hydraulic motor are changed by being operatively connected to the operation of changing the angle of a swash plate of the variable capacity hydraulic oil pump.

A power transmission process of a tractor will be described in reference to the power transmission system diagram in FIG. 1.

In the power transmission process of a tractor as shown in FIG. 1, the power which is output from an engine 10 is transmitted to a hydro-static transmission (hereinafter, referred to as "HST") 31 of a primary transmission.

The hydraulic power after the transmission by the HST 31 is transmitted to right and left front wheels 70 as front-wheel driving power or to right and left rear wheels 80 as rear-wheel driving power, through a secondary transmission 41 for driving which is structured by using a gear-type transmission.

Of the power which is output from the engine 10, mechanical power is transmitted and available when needed at a PTO (power take-off) shaft 50 as working power, through a PTO clutch 51 and a PTO transmission 52, and the hydraulic power continuously transmitted through a HST 31 is transmitted at a proper speed for driving or working in the secondary transmission 41, to be transmitted to the rear wheels or the rear and front wheels through a power transmission shaft.

Multi-plate type side brakes 60 to brake the rear wheels 80 are positioned at a rear transmission shaft which transmits the power of the HST 31 to the right and left rear wheels 80.

In the power transmission system diagram of the tractor, a clutch to control the power transmission of the engine 10 is positioned between the engine 10 and the HST 31.

Korean Published Patent Publication. No. 10-2013-0103456 (entitled: "Transmission apparatus for tractor", hereinafter, referred to as "Prior Art 1") discloses a structure of a transmission apparatus for a tractor as shown in FIG. 2.

In FIG. 2, a clutch housing 20 to include a clutch inside is positioned at the back of an engine, a HST housing 30 to include a HST 31 as a primary transmission inside is positioned at the back of the clutch housing 20, and a mission housing 40 to include a secondary transmission 41 for driving is positioned at the back of the HST housing 30.

Accordingly, the power of the engine is input to an input shaft (pump shaft) of the HST 31 through the clutch inside the clutch housing 20, the transmission power which is taken off from an output shaft (motor shaft) of the HST 31, is transmitted to three gears in the secondary transmission 41 for driving in the mission housing 40. The finally transmitted power is transmitted to the right and left rear wheels 80 through a rear differential, some of the finally transmitted power is taken off to be transmitted to the right and left front wheels 70 which are steered through a front differential, constituting a four-wheel drive transmission system.

However, in the conventional transmission apparatus disclosed in Prior Art 1, since the HST 31 positioned between the clutch housing 20 and the mission housing 40 is included in the separate HST housing 30 and a HST filter (not shown) is mounted through a filter bracket separately positioned outside the HST housing 30, the number of components increases and therefore the structure becomes very complicated, the cost of production rises and the productivity is lowered.

Further, it is very difficult to connect the input shaft of the HST 31 included in the HST housing 30 to the clutch inside the clutch housing 20.

Furthermore, since the inside of the clutch housing 20 including the clutch is closed, a lot of heat is generated by the operation of the clutch and moisture is generated inside the clutch housing 20 due to a difference from the outside temperature.

Since the technology of the tractor and the transmission apparatus of the tractor is fully described in the prior art, no further detailed description thereof will be presented.

PRIOR ART DOCUMENT

Patent Document

Prior Art 1: Korean Published Patent Publication No. 10-2013-0103456
Prior Art 2: Korean Registered Patent Publication No. 10-0602527

SUMMARY OF THE INVENTION

Therefore, it is an object of the present invention to solve the above problems and to provide a tractor with an improved clutch housing structure in which a hydro-static transmission (HST) provided between a clutch housing and a mission housing is included in the clutch housing, enabling a simple and compact structure of a power transmission apparatus.

It is another object of the present invention to provide a tractor with an improved clutch housing structure in which a clutch included inside a clutch housing is isolated from the HST and a heat-radiating opening is positioned in the clutch housing, emitting the heat generated in the clutch housing to the outside.

In accordance with an embodiment of the present invention, there is provided a tractor with an improved clutch housing structure, which includes a hydro-static transmission (HST) positioned between a clutch and a secondary transmission, to transmit power. The tractor comprises: a clutch housing with the clutch and the HST positioned inside; a partition to separate the clutch from the HST formed inside the clutch housing; and a heat-radiating opening formed in the partition.

The tractor with an improved clutch housing structure further comprises: a filter positioned at the heat-radiating opening of the partition, to prevent the clutch from being contaminated.

The tractor with an improved clutch housing structure further comprises: a guide shaft pipe formed in the partition, to guide a clutch release hub provided to the clutch.

The tractor with an improved clutch housing structure further comprises: a mounting block with an oil passage through which oil enters/exits inside, which is integrally formed with the clutch housing and mounted with a HST filter.

The tractor with an improved clutch housing structure further comprises: an assembly hole formed in the clutch housing; and a finish cap to be connected attachably/detachably to the assembly hole.

Advantageous Effects of the Invention

According to the tractor with the improved clutch housing structure of the present invention, the length of the clutch housing is extended to include the clutch in the front section of the clutch housing and to include the HST in the rear section of the clutch housing, thereby enabling a simple and compact structure of a transmission apparatus of the tractor and therefore reducing the cost of production.

Further, the mounting block with the oil passage through which the oil enters and exits is integrally formed at the outer side of the clutch housing and the HST filter is directly mounted on the mounting block, thereby making the compact structure of the dutch housing.

Further, the partition to separate the clutch and the HST is installed in the clutch housing and the heat-radiating opening is formed at the partition, thereby minimizing the contamination of the clutch and discharging the heat generated in the clutch housing to the outside.

Further, the filter is provided to the heat-radiating opening of the partition, thereby preventing pollutants from penetrating to the front section of the clutch housing where the clutch is included, to safely protect the clutch.

BRIEF DESCRIPTION OF ME DRAWINGS

The above and other features and advantages of the present invention will become more apparent to those of ordinary skill in the art by describing in detail the preferred embodiments thereof with reference to the attached drawings in which:

FIG. 1 is a power transmission system diagram of a tractor which a driving system of a general hydro-static transmission (HST) is applied to;

FIG. 2 is a sectional view of a power transmission apparatus provided to the conventional tractor;

FIG. 3 is a perspective view of a combined power transmission system far a tractor according to the present invention;

DESCRIPTION OF NUMBERS FOR CONSTITUENTS IN DRAWINGS

Figure 4:
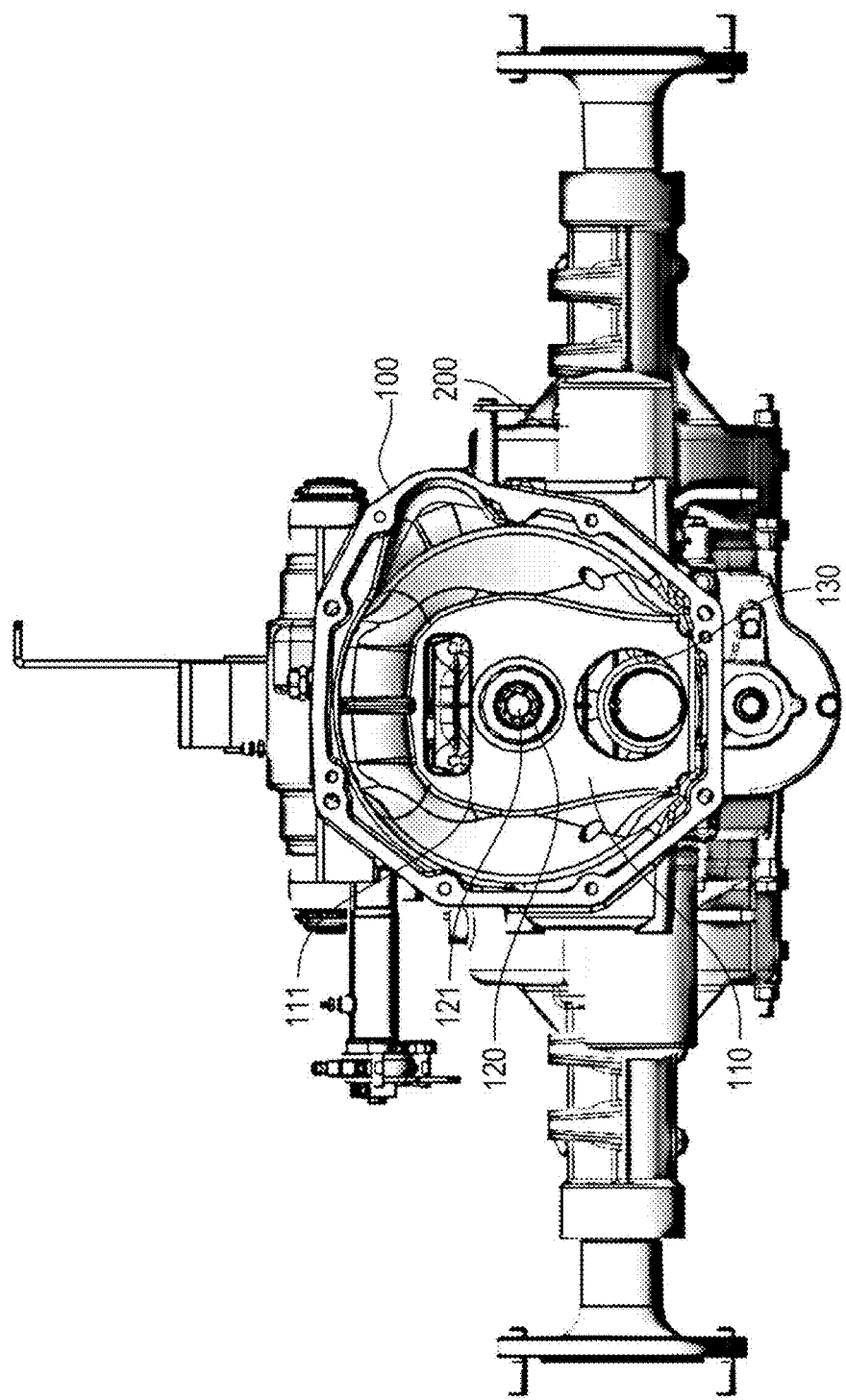
FIG. 4 is a front view of the constitution of the power transmission system according to the present invention.

10: engine 20: clutch housing
30: HST housing 31: hydro-static transmission (HST)
40: mission housing 41: secondary transmission
50: PTO shaft 51: PTO clutch
52: PTO transmission 60: side brake
70: front wheels 80: rear wheels
100: clutch housing 100a: front
100b: back 101: clutch
102: clutch release hub 103: main shaft
110: partition 111: heat-radiating opening
112: filter 120: guide shaft pipe
121: through-hole 130: molding hole
131: rubber cap 140: mounting block
150: assembly hole 151: finish-cap
160: connection hole 200: HST filter

DETAILED DESCRIPTION OF THE PREFERRED EMBODIMENT

The present invention will now be described more fully hereinafter with reference to the accompanying drawings, in which the preferred embodiment(s) of the invention is shown so that those of ordinary skill in the art can easily carry out the present invention.

In the description of the present invention, the same numbers as those used in the Prior Art refer to the same elements and the overlapping description will not be presented.

FIGS. 3 through 7 show the structure of a power transmission system of a tractor according to the present invention.

As shown in the drawings, the power transmission system to transmit power from an engine 10 to front wheels 70 and rear wheels 80 is positioned at the back of the engine 10.

Figure 5:
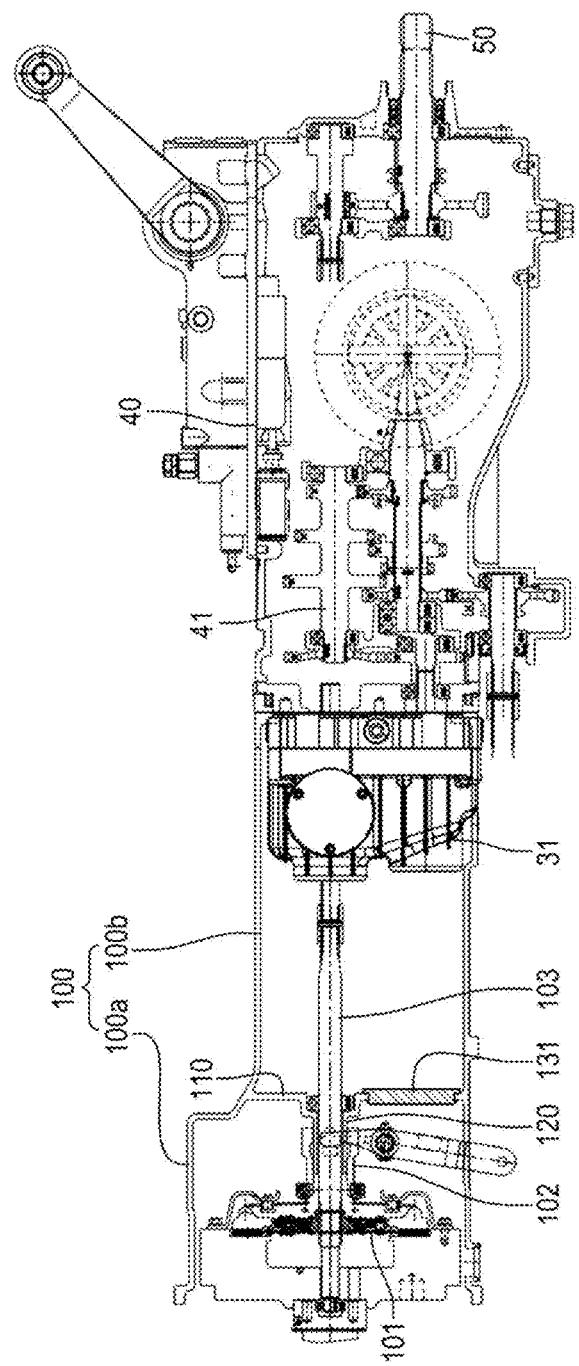
FIG. 5 is a sectional view of the combined power transmission system according to the present invention.

Specifically, as shown in FIG. 5, in the power transmission system of the tractor, a clutch 101 is connected to the back of the engine 10, a HST 31 is connected to the clutch 101, and a secondary transmission 41 is connected to the HST 31.

Therefore, the power of the engine 10 is transmitted to the front wheels 70 and the rear wheels 80 of the tractor through the clutch 101, the HST 31 and the secondary transmission 41.

The clutch 101, the HST 31 and the secondary transmission 41 are each included in a clutch housing 100 and a mission housing 40.

That is, the clutch housing 100 in which the clutch 101 and the HST 31 is positioned at the back of the engine 10, and the mission housing 40 in which the secondary transmission 41 is included is positioned at, the back of the dutch housing 100.

Specifically, the clutch housing 100 includes a partition 110 inside, to isolate a space in the clutch housing 100. Based on the partition 110, one side of the clutch housing 100 which is close to the engine 10 is named as a front section 100a and the other side is named as a rear section 100b.

The clutch 101 to control the transmission of the power which is output from the engine 10 is positioned in the front section 100a of the clutch housing 100, and the HST 31 is positioned in the rear section 100b.

A rear end of the clutch housing 100 including the clutch 101 and the HST 31 together is bolted to a front end of the mission housing 40.

In the present invention, since the conventional HST housing 30 is not needed, the overall structure of the power transmission system is simple and compact. Further, since the clutch housing 100 is directly bolted to the mission housing 40, the assembly work is reduced to improve the workability and productivity As shown in FIG. 4, a heat-radiating opening 111 is formed at an upper part of the partition 110 of the clutch housing 100, a guide shaft pipe 120 to guide a clutch release hub 102 is formed to protrude at the middle part thereof.

Specifically, the heat-radiating opening 111 formed at the upper part of the partition 110 is to discharge the heat generated by the operation of the clutch 101 in the front section 100a of the clutch housing 100, where the clutch 101 is positioned, toward the rear section 100b of the clutch housing 100 where the HST 31 is positioned. The heat discharged to the rear section 100b of the clutch housing 100 is discharged to the outside of the clutch housing 100, through an assembly hole 150 and a connection hole 160 formed on the outer side of the clutch housing 100, to be described later.

The heat-radiating opening 111 is provided with a filter 112 to cover the heat-radiating opening 111.

When the pollutants, such as soil, dust, etc., which enter into the rear section 100b of the clutch housing 100 through the assembly hole 150 and the connection hole 160, enter into the front section 100a of the clutch housing 100 through the heat-radiating opening 111, since the filter 112 positioned at the heat-radiating opening 111 collectively filters the pollutants contained in the air, the clutch 101 is prevented from being contaminated and therefore it is possible to prevent the malfunction of the clutch 101.

The filter 112 positioned at the heat-radiating opening 111 may be a HEPA filter with a high-efficiency collecting function capable of filtering pollutants such as particulate dust contained in the air.

As shown in FIG. 5, the guide shaft pipe 120 under the heat-radiating opening 111 is a hollow pipe with a through-hole 121 which is formed in an axial direction parallel to the center line of the clutch housing 100. The guide shaft pipe 120 is integrally formed to protrude from the partition 110.

A main shaft 103 which is connected to the engine 10 and outputs the power of the engine 10 is provided through the through-hole 121 of the guide shaft pipe 120. The clutch release hub 102 to connect or separate a disk of the clutch 101 is fitted around the outer side of the guide shaft pipe 120. The clutch release hub 102 moves back and forth in a straight line on the outer side of the guide shaft pipe 120, by a transmission rod as a driver works a transmission pedal.

Specifically, since the main shaft 103 where the power of the engine is output is provided to pass through the through-hole 121 of the guide shaft pipe 120, it transmits the power of the engine 10 to the front wheels 70 and the rear wheels 80 stably without any interference with the clutch release hub 102. Since the clutch release hub 102 is fitted about the outer side of the guide shaft pipe 120, it smoothly operates the clutch 101 without any interference with the main shaft 103.

A molding hole 130 is formed under the guide shaft pipe 120 in the partition 110. The molding hole 130 is unavoidably formed by a core made in a cast in which molten metal is poured upon cast-molding the clutch housing 100. The molding hole 130 is closed in a state of firmly maintaining airtight and watertight by connecting a rubber cap 131 to the molding hole 130.

Therefore, it is possible to prevent the oil supplied to the HST 31 from leaking through the molding hole 130 and to minimize a damage caused by flooding of the clutch housing 100.

Figure 6:
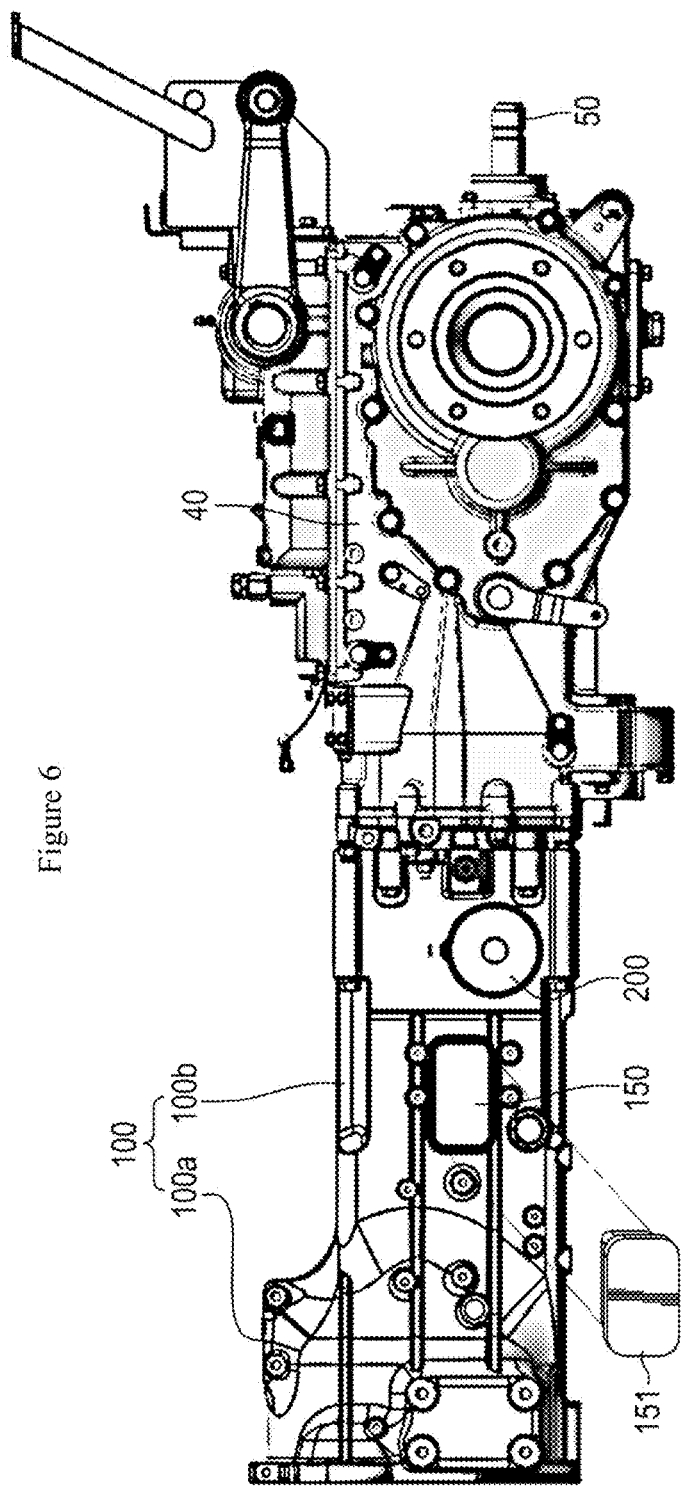
FIG. 6 is a right side view of the constitution of the power transmission system of FIG. 3.

As shown in FIGS. 3 and 6, a mounting block 140 with an oil passage through which the oil enters and exits is integrally formed on the outer side of the clutch housing 100. An HST filter 200 is mounted on the mounting block 140, to filter the oil provided to the HST 31 to supply the filtered oil to the HST 31.

Specifically, since the mounting block 140 with the HST filter 200 is integrally formed to be included at the outer side of the rear section 100b of the clutch housing 100, the structure of the clutch housing 100 is compact.

The assembly hole 150 for access to connect the main shaft 103 and the input shaft of the HST 31 is formed at the outer side of the rear section 100b of the clutch housing 100 in the front of the HST filter 200. It is preferable to form the assembly hole 150 with a size permitting the hand of an operator to enter/exit.

Accordingly, since the operator can insert his/her hand into the clutch housing 100 through the assembly hole 150, the main shaft 103 and the input shaft of the HST 31 are easily connected, to improve the assembly and maintenance.

In addition, since the pollutants may enter through the assembly hole 150, it is preferable to close the assembly hole 150 with a finish cap 151 after connecting the main shaft 103 and the HST 31. The finish cap 151 may be formed of a rubber material which is excellent in airtight and watertight attributes.

When the assembly hole 150 is used (including when the heat is radiated), the finish cap 151 is separated from the assembly hole 150. After the assembly hole 150 is used, the finish cap 151 is connected to the assembly hole 150 for closure of the opening.

Figure 7:
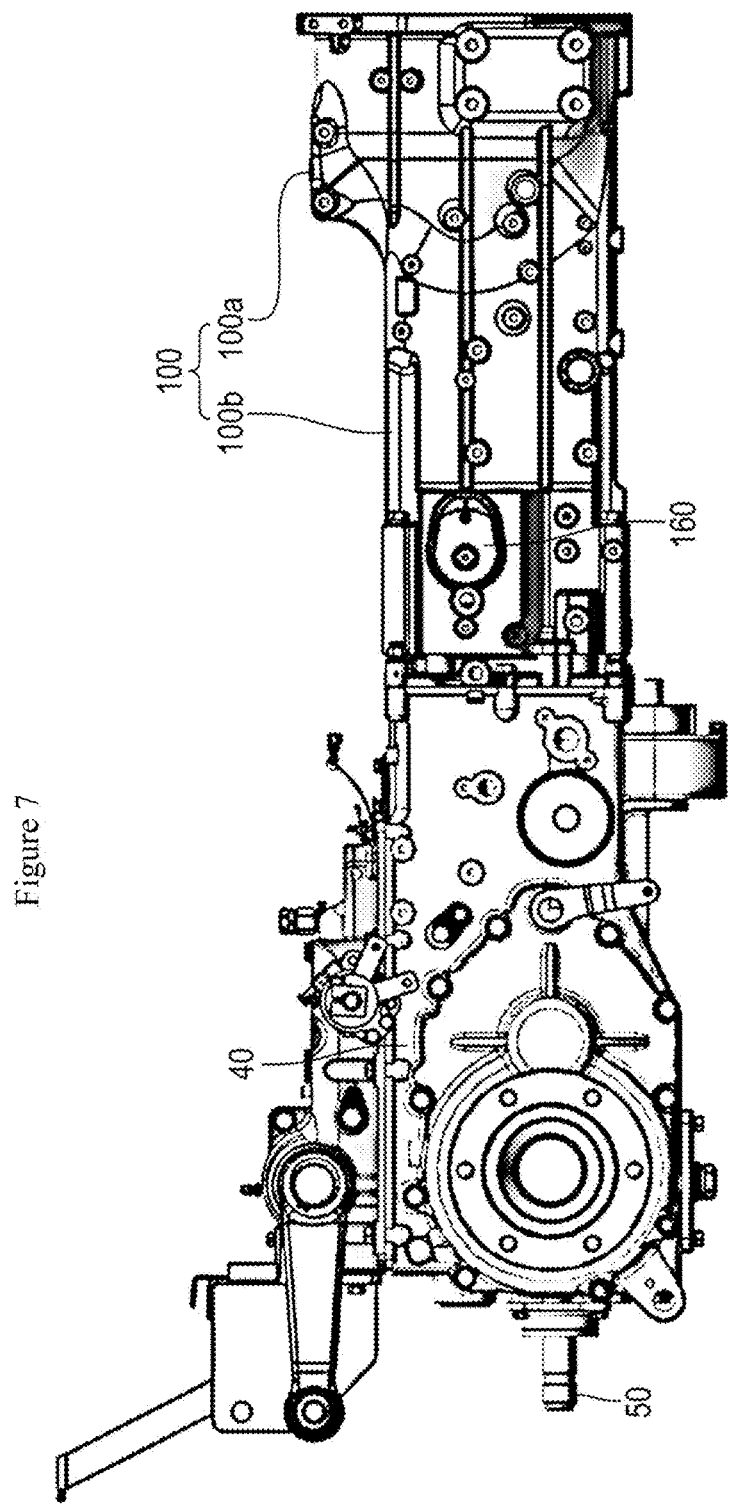
FIG. 7 is a left side view of the constitution of the power transmission system of FIG. 3.

As shown in FIG. 7, the connection hole 160 to connect an operation lever of the HST 31 is formed at the outer side of the clutch housing 100 opposite to that where the assembly hole 150 is positioned.

The connection hole 160 is provided with a cap of a rubber material, which does not interrupt the operation lever of the HST 31, thereby minimizing exposure by sealing the connection hole 160.

In the power transmission system of the tractor according to the present invention, since the clutch 101 is included in the front section 100a of the clutch housing 100 and the HST 31 is included in the rear section 100b of the clutch housing 100, the clutch 101 and the HST 31 are all included in one clutch housing 100, enabling a simple and compact structure of the power transmission system and reducing the number of parts to lower the cost of production.

Since the partition 110 is formed to separate the clutch 101 from the HST 31 inside the clutch housing 100 and the heat-radiating opening 111 is formed in the partition 110, the clutch 101 is prevented from being contaminated and the heat generated by the clutch 101 is discharged to the outside of the clutch housing 100 through the heat-radiating opening 111, the assembly hole 150 and the connection hole 160.

Further, since the filter 112 which is a HEPA filter is provided to the heat-radiating opening 111 of the partition 110, the pollutants are prevented from penetrating into the front section 100a of the clutch housing 100 where the clutch 101 is included, to prevent the contamination of the clutch 101.

Further, since the mounting block 140 to mount the HST filter 200 is integrally formed to be included at the outer side of the clutch housing 100, the outside structure of the clutch housing 100 is compact.

The invention has been described using preferred exemplary embodiments. However, it is to be understood that the scope of the invention is not limited to the disclosed embodiments. On the contrary, the scope of the invention is intended to include various modifications and alternative arrangements within the capabilities of persons skilled in the art using presently known or future technologies and equivalents.

Simple modifications or similar arrangements of the present invention belong to the category of the invention and therefore, the protection range of the invention will be apparent by the claims attached herewith.

What is claimed is:

1. A tractor with a hydro-static transmission (HST) (31) which is positioned between a clutch (101) and a secondary transmission (41), to transmit power, the tractor comprising:
    a clutch housing (100) with the clutch (101) and the HST (31) positioned inside;
    a partition (110) to separate the clutch (10) from the HST (31) formed inside the clutch housing (100); and
    a heat-radiating opening (111) formed in the partition (110); and
    a filter (112) positioned at the heat-radiating opening (111) of the partition (110), to prevent the clutch (101) from being contaminated.

2. The tractor according to claim 1, further comprising:
    a guide shaft pipe (120) formed in the partition (110), to guide a clutch release hub (102) provided to the clutch (101).

3. The tractor according to claim 1, further comprising:
    a mounting block (140) with an oil passage through which oil enters/exits inside, which is integrally formed with the clutch housing (100) and mounted with a HST filter (200).

4. The tractor according to claim 1, further comprising:
    an assembly hole (150) formed in the clutch housing (100); and
    a finish cap (151) to be connected attachably/detachably to the assembly hole (150).

* * * * *